US009662636B2

(12) United States Patent
Gramiccioni et al.

(10) Patent No.: US 9,662,636 B2
(45) Date of Patent: May 30, 2017

(54) ZONED CATALYST COMPOSITES (71) Applicant: BASF Corporation, Florham Park, NJ (US)

(72) Inventors: Gary A Gramiccioni, Madison, AL (US); Andreas Richard Munding, Madison, AL (US); Kenneth E. Voss, Somerville, NJ (US); Torsten Neubauer, Langenhagen (DE); Stanley A. Roth, Yardley, PA (US)

(73) Assignee: BASF Corporation, Florham Park, NJ (US)

( * ) Notice: Subject to any disclaimer, the term of this patent is extended or adjusted under 35 U.S.C. 154(b) by 0 days.

(21) Appl. No.: 14/681,552

(22) Filed: Apr. 8, 2015

(65) Prior Publication Data
US 2015/0298098 A1  Oct. 22, 2015

Related U.S. Application Data (60) Provisional application No. 61/980,846, filed on Apr. 17, 2014.

(51) Int. Cl.
*B01D 53/94* (2006.01)
*B01J 23/00* (2006.01)
(Continued)

(52) U.S. Cl.
CPC .......... *B01J 23/464* (2013.01); *B01D 53/944* (2013.01); *B01D 53/945* (2013.01);
(Continued)

(58) Field of Classification Search
CPC ... B01J 23/00; B01J 23/02; B01J 23/10; B01J 23/40; B01J 23/56; B01J 23/58;
(Continued)

(56) References Cited

U.S. PATENT DOCUMENTS 6,375,910 B1 * 4/2002 Deeba ................ B01D 53/9422
422/171
6,517,899 B1   2/2003 Hoke et al.
(Continued)

FOREIGN PATENT DOCUMENTS

CN   1436599   8/2003
CN   1453072   11/2003
(Continued)

OTHER PUBLICATIONS

International Search Report with written opinion dated Jul. 14, 2015.

*Primary Examiner* — Cam N. Nguyen
(74) *Attorney, Agent, or Firm* — Womble Carlyle Sandridge & Rice LLP (57) ABSTRACT

Provided herein are zoned catalysts that utilize components efficiently in that relatively short zones are provided to achieve specific functionalities to convert and/or trap one or more components in the exhaust stream. Highly controlled zoned are formed from one end of a monolithic carrier. The zones have a flat profile such that the zoned catalytic material within each passage of the substrate is at a substantially uniform distance from one end of the carrier. Methods of making and using the same are also provided.

21 Claims, 4 Drawing Sheets

Comparative   Example 2
Example 3

(51) Int. Cl.
B01J 23/02 (2006.01)
B01J 23/10 (2006.01)
B01J 23/40 (2006.01)
B01J 23/56 (2006.01)
B01J 23/58 (2006.01)
B01J 37/02 (2006.01)
B01J 29/00 (2006.01)
B01J 35/02 (2006.01)
B01J 23/46 (2006.01)
B01J 23/44 (2006.01)
B01J 23/42 (2006.01)
B01J 35/00 (2006.01)
B05D 1/18 (2006.01)
B05D 3/04 (2006.01)
B05D 7/22 (2006.01)
B01J 29/74 (2006.01)
B01J 35/04 (2006.01)

(52) U.S. Cl.
CPC .......... *B01D 53/9418* (2013.01); *B01J 23/42* (2013.01); *B01J 23/44* (2013.01); *B01J 35/0006* (2013.01); *B01J 37/0219* (2013.01); *B01J 37/0244* (2013.01); *B01J 37/0246* (2013.01); B01D 2255/1021 (2013.01); B01D 2255/1023 (2013.01); B01D 2255/1025 (2013.01); B01D 2255/2092 (2013.01); B01D 2255/20715 (2013.01); B01D 2255/50 (2013.01); B01D 2255/908 (2013.01); B01D 2255/9022 (2013.01); B01D 2255/9032 (2013.01); B01D 2255/9202 (2013.01); B01J 29/7415 (2013.01); B01J 35/002 (2013.01); B01J 35/04 (2013.01); B01J 2229/37 (2013.01); B05D 1/18 (2013.01); B05D 3/0493 (2013.01); B05D 7/22 (2013.01); Y02T 10/22 (2013.01)

(58) Field of Classification Search
CPC ...... B01J 29/00; B01J 35/023; B01J 37/0219; B01J 37/0244; B01D 53/9418; B01D 53/944; B01D 53/945
USPC ... 502/66, 74, 240, 261, 300, 326–328, 330, 502/332–334, 339, 439; 423/213.2, 423/213.5; 60/299
See application file for complete search history.

(56) References Cited

U.S. PATENT DOCUMENTS

| | | | |
|---|---|---|---|
| 6,616,903 B2 | 9/2003 | Poles et al. | |
| 6,863,984 B2 | 3/2005 | Hoke et al. | |
| 7,189,376 B2 | 3/2007 | Kumar et al. | |
| 7,308,788 B1 | 12/2007 | Das | |
| 7,745,367 B2 | 6/2010 | Fujdala et al. | |
| 7,749,472 B2 | 7/2010 | Chen et al. | |
| 7,906,454 B2* | 3/2011 | Wolf | B01D 53/945 422/177 |
| 8,038,956 B2* | 10/2011 | Li | B01D 53/9454 422/177 |
| 8,114,354 B2* | 2/2012 | Li | B01D 53/9454 422/177 |
| 8,246,922 B2* | 8/2012 | Boorse | B01D 53/9445 422/170 |
| 8,246,923 B2* | 8/2012 | Southward | B01D 53/9468 422/180 |
| 8,263,033 B2* | 9/2012 | Dobson | B01D 53/9472 422/177 |
| 8,557,203 B2* | 10/2013 | Bailey | B01D 53/944 422/170 |
| 8,557,204 B2* | 10/2013 | Nunan | B01D 53/945 422/177 |
| 8,640,440 B2* | 2/2014 | Klingmann | B01D 53/944 422/170 |
| 8,709,365 B2* | 4/2014 | Dornhaus | B01D 53/944 422/177 |
| 8,883,100 B2* | 11/2014 | Paulus | B01D 53/9468 422/170 |
| 8,968,690 B2* | 3/2015 | Nunan | B01D 53/945 422/177 |
| 9,034,286 B2* | 5/2015 | Bergeal | B01D 53/945 422/180 |
| 2004/0079060 A1 | 4/2004 | Alward | |
| 2005/0159308 A1 | 7/2005 | Bliss et al. | |
| 2008/0226514 A1 | 9/2008 | Chen et al. | |
| 2009/0007553 A1 | 1/2009 | Simon, III et al. | |
| 2009/0149323 A1 | 6/2009 | Sunada et al. | |
| 2009/0217652 A1 | 9/2009 | Bergeal et al. | |
| 2009/0246109 A1 | 10/2009 | Southward | |
| 2010/0263358 A1 | 10/2010 | Chen et al. | |
| 2010/0290964 A1 | 11/2010 | Southward et al. | |
| 2011/0005211 A1 | 1/2011 | Tissler et al. | |
| 2011/0033353 A1 | 2/2011 | Siani et al. | |
| 2011/0212008 A1 | 9/2011 | Punke et al. | |
| 2011/0268624 A1 | 11/2011 | Chandler et al. | |
| 2012/0077669 A1 | 3/2012 | Muller-Stach et al. | |
| 2012/0124974 A1 | 5/2012 | Li et al. | |
| 2012/0180464 A1 | 7/2012 | Wei et al. | |
| 2013/0089481 A1 | 4/2013 | Sumiya et al. | |
| 2013/0149207 A1 | 6/2013 | Castagnola et al. | |
| 2013/0152548 A1 | 6/2013 | Cole et al. | |

FOREIGN PATENT DOCUMENTS

| | | |
|---|---|---|
| CN | 101024182 | 8/2007 |
| CN | 100569362 | 4/2008 |
| CN | 102465740 | 5/2012 |
| CN | 102909024 | 2/2013 |
| CN | 103011903 | 4/2013 |
| DE | 10303651 | 8/2004 |
| DE | 10-2007-048313 | 4/2009 |
| JP | 2000-279824 | 10/2000 |
| JP | 2007-069107 | 3/2007 |
| JP | 2009-247955 | 10/2009 |
| JP | 2011-218294 | 11/2011 |
| JP | 2013-180235 | 9/2013 |
| WO | WO 01/54801 | 8/2001 |
| WO | WO-2009/049795 | 4/2009 |
| WO | WO-2009/120866 | 10/2009 |
| WO | 2010/030226 A2 | 10/2010 |
| WO | 2010/118125 A2 | 10/2010 |
| WO | 2010-121236 A2 | 10/2010 |
| WO | WO-2010/131369 | 11/2010 |
| WO | WO-2011/017139 | 2/2011 |
| WO | 2012/079598 A1 | 6/2012 |

* cited by examiner

Comparative Example 3    Example 2

ZONED CATALYST COMPOSITES

CROSS-REFERENCE TO RELATED APPLICATIONS

This application claims priority under 35 U.S.C. §119(e) to U.S. Patent Application Ser. No. 61/980,846, filed Apr. 17, 2014, which is hereby incorporated by reference in its entirety.

TECHNICAL FIELD

The present invention is directed to an exhaust gas purifying catalyst and methods for its use. More particularly, the invention pertains to a zoned catalyst composite comprising a zone of catalytic material on a monolithic carrier, where the zone assists with a desired functionality such as fast light-off and/or soot burning. The zones have a flat profile such that the zoned catalytic material within each passage of the substrate is at a substantially uniform distance from one end of the carrier. These zones provide catalytic activity, component trapping, and/or adsorbing properties. The zones offer substantially uniform thickness and component concentration along the length of the zone.

BACKGROUND

Catalytic converters treat exhaust gas streams of combustion engines to convert, trap, and/or adsorb undesirable components in order to meet stringent emissions standards. Components used in catalytic converters include, but are not limited to platinum group metals (PGM), base metals (BM), oxygen storage components (OSC), and/or molecular sieves—such as zeolites. Catalytic converters are designed to meet the needs of specific applications such as exhaust streams of diesel engines (e.g., Diesel Oxidation Catalysts (DOCs), Selective Catalytic Reduction (SCR) catalysts, and Catalyzed Soot Filters (CSF)) and of gasoline engines (Three-Way Conversion (TWC) catalysts). Zoned and/or layered catalysts are further designed used to achieve specific chemistries at specific locations.

Multi-zoned catalysts and traps are disclosed in U.S. Pat. No. 7,189,376 (Kumar). An overcoat layer to provide poison-resistant catalysts is provided in U.S. Pat. No. 7,749,472 (Chen).

There is a continuing need in the art for zoned catalytic articles that provide excellent catalytic activity, component trapping, and/or adsorbing properties.

SUMMARY

Provided herein are improved zoned catalysts that utilize components efficiently in that relatively short zones are provided to achieve specific functionalities. Highly controlled zoned are formed from one end of a monolithic carrier. The zones have a flat profile such that the zoned catalytic material within each passage of the substrate is at a substantially uniform distance from one end of the carrier.

A first aspect provides a zoned catalyst composite for an exhaust stream of an internal combustion engine comprising: a monolithic carrier comprising a plurality of longitudinal passages; a zone that begins from one end of the carrier and extends axially along the longitudinal passages such that the zone has a flat profile, the zone comprising a catalytic material that is effective to convert and/or trap one or more components in the exhaust stream.

The component may be carbon monoxide (CO), hydrocarbons (HC), nitrogen oxides (NOx), soot, ammonia ($NH_3$), $SO_x$ ($SO_2$, $SO_3$) and/or hydrogen disulfide ($H_2S$). The zone may comprise up to one inch (2.54 cm) of the carrier's length. The zone may comprise in the range of 2 mm to 0.5 inches (1.27 cm) carrier's length. The zone may have an average thickness in the range of 10-60 μm. The zone may be formed from a washcoat that is shear thinning having a pseudoplastic index in the range of 5-7. The zone may be formed from a washcoat that has a viscosity in the range of 100-750 centipoise (cp). The zone may be formed from a washcoat that has a yield point in the range of 1.5-10.0. The zone may be formed from a washcoat loading in the range of 0.10 to 1.0 g/in³.

The catalytic material may comprise a platinum group metal (PGM), a base metal (BM), an oxygen storage component (OSC), and/or a molecular sieve. The zone may comprise a mean particle size in the range of 5 to 20 μm.

The zone may be formed from a washcoat that comprises the catalytic material in combination with a rheology system having one or more organic compounds comprising a polymeric thickener, a surfactant, and/or a dispersant. The rheology system comprises a polymeric thickener, a surfactant, and a dispersant.

The distance of the zone from the one end of the carrier may vary in the range of 0 to 15% (relative) from passage-to-passage. The concentration of active components in the catalytic material of the zone at the one end of the carrier as compared the concentration at the end of the zone may vary in an amount of not more than 10%. The thickness of the zone for each passage at the one end of the carrier as compared the thickness at the end of the zone may vary in an amount of not more than 15%.

Another aspect provides a system for treatment of an internal combustion engine exhaust stream including hydrocarbons, carbon monoxide, and other exhaust gas components, the emission treatment system comprising: an exhaust conduit in fluid communication with the internal combustion engine via an exhaust manifold; and any of the zoned catalyst composites provided herein.

A further aspect provides a method for treating exhaust gases comprising contacting a gaseous stream comprising hydrocarbons, carbon monoxide, and nitrogen oxides with any of the zoned catalyst composites provided herein.

In an additional aspect, a method of making a zoned catalyst composite, the method comprising: forming a shear thinning washcoat; and dipping an inlet end of a monolithic carrier comprising a plurality of longitudinal passages into the washcoat to a depth to form an inlet zone that has a flat profile. The method may further comprise after dipping, providing a gaseous pulse through the longitudinal passages to remove excess washcoat. The method may further comprise applying a vacuum pressure to the passages during the dipping step.

BRIEF DESCRIPTION OF THE DRAWINGS

The disclosure may be more completely understood in consideration of the following detailed description of various embodiments of the disclosure in connection with the accompanying drawings, in which.

DETAILED DESCRIPTION

It has been found that the use of a washcoat with a shear thinning viscosity property permits the formation of a highly controlled zone from an end of a monolithic carrier that may be concentrated with active components such as platinum group metals (PGM), base metals (BM), oxygen storage components (OSC), and/or molecular sieves for light-off and/or soot burning and/or trapping purposes.

Reference to "monolithic carrier" means a unitary structure that is homogeneous and continuous and has not been formed by affixing separate carrier pieces together.

A "zone" is catalytic material located on (directly or indirectly) a substrate over a portion of the substrate starting at one end. An "inlet zone" means that such a zone originates at the inlet end of the substrate, which is the end the exhaust gas enters first, and ends at an axial distance down the substrate towards the outlet end, but extends a distance that is less than the entire distance of the substrate. An "outlet zone" means that such a zone originates at the outlet end of the substrate, which is the end from which the exhaust gas exits, and ends at an axial distance up the substrate towards the inlet end, but extends a distance that is less than the entire distance of the carrier. Short zones are preferred, for example up to 1 inch (2.54 cm) or even 0.5 inches (1.27 cm) or even 0.25 inches (0.63 cm). The zoned catalyst composites may have an inlet zone, an outlet zone, or both inlet and outlet zones. Each zone may be tailored to specific functions depending on the application.

By "highly controlled," it is meant that the zone has a flat profile due to the uniform distribution of washcoat through the passages of the monolithic carrier. Thus, a "flat profile" is one having a substantially uniform thickness of catalytic material whose distance from one end of the carrier is also substantially uniform. For example, the distance from passage-to-passage may vary in a small range of 0 to 5% of the distance as measured by digital x-ray or optical microscopy. Also, the thickness of the zone may vary only in an amount of not more than 15% as measured by either optical or scanning electron microscopy (SEM). It is also expected that concentration of ingredients throughout the zone is substantially uniform. For example, for each passage, the concentration of active components in the catalytic material of the zone at the one end of the carrier as compared the concentration at the end of the zone along the distance of the passage varies in an amount of not more than 10% as measured by inductively coupled plasma spectroscopy (ICP). To achieve a flat profile, a washcoat is formed from a catalytic material in conjunction with a rheology modifier system, which is one or more organic compounds comprising a polymeric thickener, a surfactant, and/or a dispersant that modify the rheology of the washcoat.

As used herein, the term "washcoat" has its usual meaning in the art of a thin, adherent coating of a catalytic or other material applied to a carrier.

Reference to "shear thinning" means that a fluid's viscosity decreases upon the application of shear stress. A pseuodplastic index is one way to depict shear thinning character of a fluid, defined as a dimensionless ratio of viscosity @6 rpm/viscosity @60 rpm. Another indication of shear thinning character is by the yield point of a fluid, where yield point is the stress at which the fluid begins to deform non-reversibly/plastically. Referring to Herschel-Bulkley rheology model, yield point is defined as $\tau_0$ and the flow index n defines viscosity type, $\tau_0>0$ and $n<1$ indicate pseudoplasticity (shear thinning behavior). Preferred $\tau_0$ range of 1.5 to 10.0, n range of 0.5 to 0.9 (both being unitless).

"Mean particle size" as used herein refers to a particle size density (distribution) where d50 represents the mean particle size or size specified as 50% of distribution, d10, d90, and d99 further define distribution width where a narrow distribution is preferred. Measurements are based on use of a Cilas 1090 dual laser particle size analyzer capable of measuring particles between 0.04-500 mm in size, all measurements are based on samples taken from wet dispersions otherwise known as a slurry (mixture of particles in aqueous media between 10-50 wt % solid fraction).

"Voids" or "macropores" in the washcoat refers to areas of no material that can be discerned via scanning electron microscopy (SEM) and measured at their widest part.

Zoned Catalyst Composites & Catalytic Material

The zoned catalyst composites are prepared by forming a shear thinning washcoat tailored to meet a desired functionality of the zone and dipping an end of a monolithic carrier into the washcoat to a depth to form a zone that has a flat profile along longitudinal passages of the carrier. A vacuum may be applied to the passages to facilitate their coating by the washcoat. A gaseous pulse may be applied through the passages in a direction opposite dip face to remove any excess washcoat and subsequently maintain a flat profile. Generally, the zone is applied over an underlying catalyst composite on the monolithic carrier. Alternatively, should it be desired, the zone may be applied to a carrier directly.

As an example of a zone on an underlying catalyst composite, to enhance light-off of a three-way conversion (TWC) catalyst or a diesel oxidation catalyst (DOC), an inlet zone comprising palladium, for example, may be applied to a catalyst composite that is already designed to meet TWC or DOC functionality. The presence of extra precious metal component in the zone facilitates light-off relative to the underlying catalyst composites. For another example, a selective catalytic reduction (SCR) catalyst composite may be enhanced by the addition of an outlet zone comprising additional zeolite and/or base metal that is effective to convert residual ammonia ($NH_3$). On a DOC, another example is an inlet zone comprising a molecular sieve that may be used to enhance hydrocarbon trapping during cold start-up. For soot and SOF (soluble organic fraction), a short zone of extra PGM and/or base metal can be added in order to oxidize excessive soot and SOF to prevent accumulation, subsequent pressure drop increase and fouling of the DOC and any additional components downstream in the exhaust system (like SCR catalysts). Another example short zones of highly concentrated Ni, Mn, Sr and Ce oxides to bond and/or trap sulfur compounds for release/regeneration under more controlled, low temperature conditions <750° C. This is especially helpful for catalysts containing Ba as $BaSO_4$ typically requires higher regeneration temperatures >850° C.

Catalytic material suitable for the zone includes, but is not limited to: a platinum group metal (PGM), a base metal (BM), an oxygen storage component (OSC), and/or a molecular sieve. Washcoats are formed by slurries of catalytic material in combination with a rheology modifier system.

It is understood that the materials used in a specific zone are compatible with one another and will be effective to achieve a desired function.

Suitable PGMs may include: palladium, rhodium, platinum, and/or combinations of the same.

Suitable base metals may include: Ni, Fe, Mn, Cu, Co, Ba, Mg, Ga, Ca, Sr, V, W, Bi and/or Mo.

Suitable oxygen storage components may include: ceria, praseodymia, or combinations thereof. Delivery of ceria into the zone can be achieved by the use of, for example, ceria, a mixed oxide of cerium and zirconium, and/or a mixed oxide of cerium, zirconium, and neodymium.

Molecular sieves refer to materials, which have a substantially uniform pore distribution, with the average pore size being no larger than 20 Å. Zeolites are aluminosilicate crystalline materials having rather uniform pore sizes which, depending upon the type of zeolite and the type and amount of cations included in the zeolite lattice, typically range from about 3 to 10 Angstroms in diameter. Specific non-limiting examples include SSZ-13, SSZ-62, Beta (β). SAPO-type molecular sieves refer to corner sharing tetrahedral frameworks where the majority of the tetrahedral sites are occupied by aluminum and phosphorus. Non-limiting examples of SAPO-type molecular sieves include silico-alumino-phosphates and ALPO-type metal-alumino-phosphates. A specific non-limiting example includes SAPO-34.

The zones are relatively short, and may comprise up to one inch (2.54 cm) of the carrier's length. In a detailed example, the zone comprises in the range of 2 mm to 0.5 inches (1.27 cm) carrier's length. The zones may be formed from a washcoat loading in the range of zone is formed from a washcoat loading in the range of 0.10 to 1.0 $g/in^3$ or 0.20 to 0.8 $g/in^3$ or even 0.40 to 0.6 $g/in^3$. As to thickness, the zone typically has an average thickness in the range of 10-60 μm. The zone may comprise a mean particle size in the range of 5 to 20 μm. It is noted that for one or more embodiments, the particle size range is narrow creating similar random voids (macropores) in the washcoat ranging also from 5 to 20 μm.

Variability in the zone is minimized by the techniques disclosed herein. For example, the distance from passage-to-passage may vary in a small range of 0 to 5% (or 0.5 to 4% or 1-3%). Also, the thickness may vary only in an amount of not more than 15% (or 10% or even 5%). Further, for each passage, the concentration of active components may vary in an amount of not more than 10% (or 7.5 or even 5%) as measured by SEM.

Figure 1:
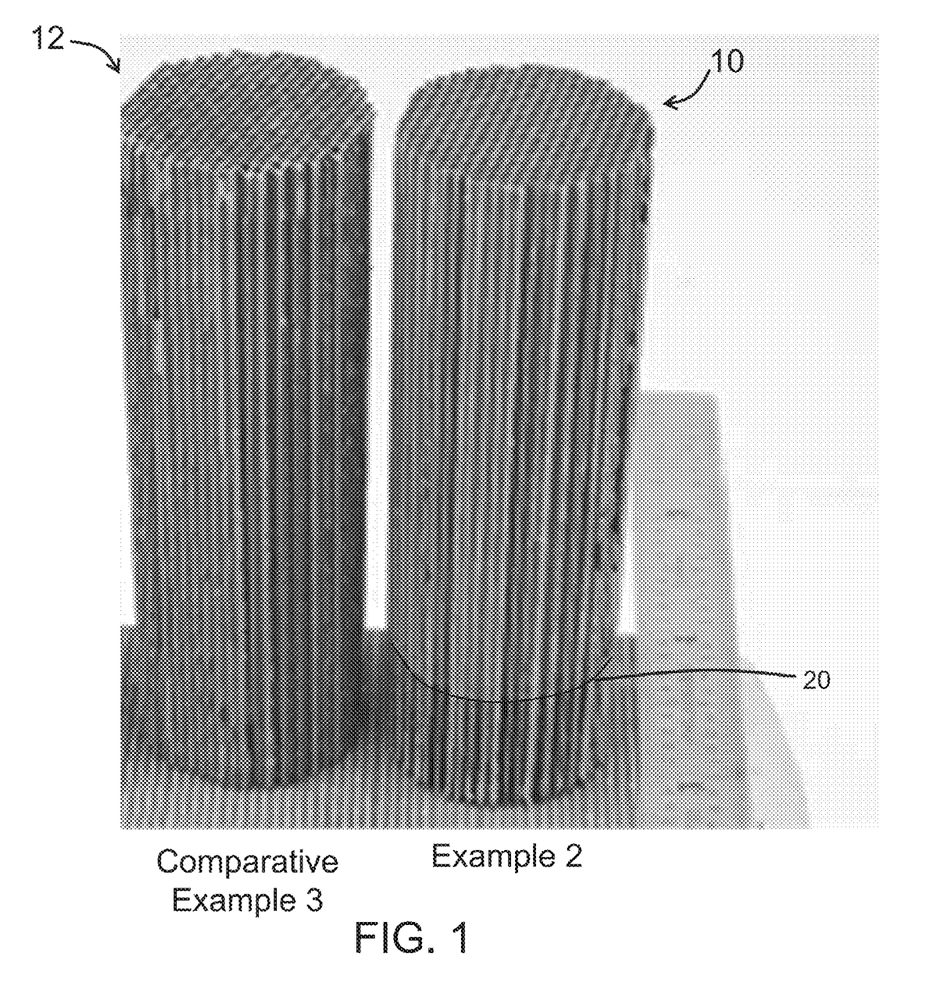
FIG. 1 provides a photograph of a zoned catalyst composite and a non-zoned catalyst composite.
Figure 2:
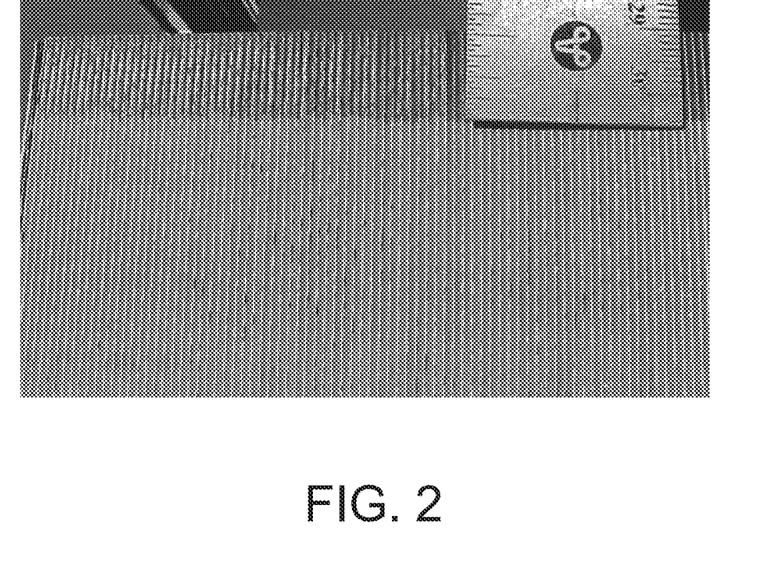
FIG. 2 provides a close-up photograph of a zoned catalyst composite having a flat profile.

An exemplary coater machine comprises: a reservoir for a washcoat; and a dipping module comprising an arm, a clamp operatively attached to the arm, and a controller such that after securing a substrate in the clamp, the dipping module immerses an inlet end of a monolithic carrier comprising a plurality of longitudinal passages into the reservoir to a depth; or a roller station that applies the dipping washcoat or another washcoat to a face of the substrate. The washcoat generally has shear thinning properties. A gas source to the coater may provide a gaseous pulse through the longitudinal passages after the dipping module or the roller station step. The coater may further comprise a calcination module that imparts heat to the zoned catalytic composite. The depth that the carrier is dipped is determined based on the zone design with respect to length, thickness, and/or dry gain. The zoned catalytic composite thus formed has an inlet zone that has a flat profile. Turning to FIG. 1, a zoned catalyst composite 10 having a flat profile 20 has been prepared using a rheology system as disclosed over an underlying catalyst as discussed in Example 2. A non-zoned catalyst composite 12 that has an underlying catalyst only and does not have a zone is shown as Comparative Example 3 in FIG. 1. FIG. 2 demonstrates a short zone with a flat profile, and nominal length of 0.5" (12.7 mm) which was prepared as discussed in Example 5.

Figure 3:
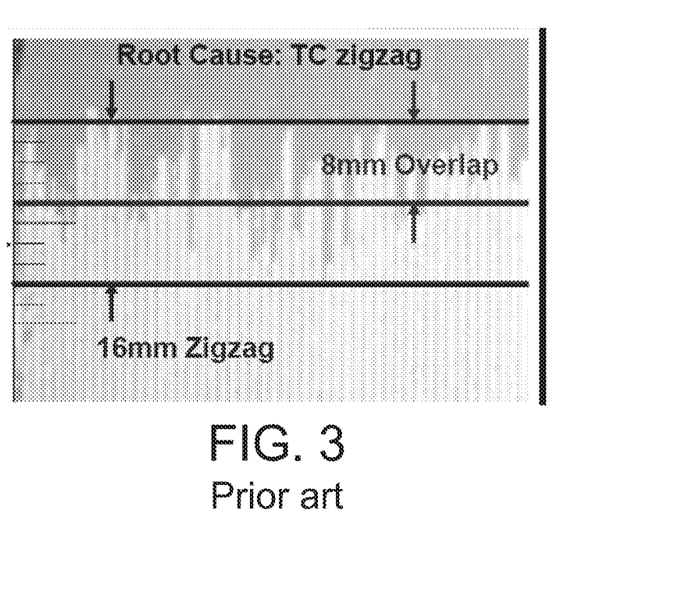
FIG. 3 provides a photograph of a zone profile that is not flat.

In FIG. 3, provided is a photograph of a prior art example where a zone was prepared in the absence of a rheology modifier system, thereby demonstrating a zig zag or not flat profile, which does not amount to a flat profile according to the embodiments of the present invention.

Rheology System

The washcoat for the zone is formed from a catalytic material in conjunction with a rheology modifier and/or mixture of modifiers. The rheology modifier is made up of compounds that impact the viscosity and shear thinning properties of the washcoat having a certain solids loading, and that likewise suppress capillary action of the washcoat in the passages of the substrate. An exemplary shear thinning character may be a pseudoplastic index in the range of 5-7. An exemplary viscosity of the washcoat may be in the range of 100-750 centipoise (cP). An exemplary yield point of the washcoat may be in the range of 1.5-10.0.

The rheology modifier may have, for example, one or more organic compounds comprising a polymeric thickener, a surfactant, and/or a dispersant. This combination will be referred to as a rheology system herein. Specific embodiments include all of the components: the polymeric thickener, the surfactant, and the dispersant. An exemplary polymeric thickener is an associative thickener, but other traditional thickeners such as cellulose may be suitable. Thickeners used in the rheology systems herein are typically hydrophobic. A surfactant is preferably has a low HLB (hydrophilic-lipophilic balance), in the range of 2 to 6 for example, which encourages compatibility with hydrophobic materials. A dispersant assists in keeping the materials in the washcoat well spread-out or dispersed, which includes both organic and inorganic materials. A rheology system having all of a polymeric thickener, a low HLB surfactant, and a dispersant provides a synergistic combination of functionalities to provide a shear thinning washcoat. Upon calcination of a catalyst composite, the components of the rheology system are removed creating some added interconnectivity (smaller pores) to the macropores formed primarily by the particle packing density of inorganic washcoat components.

Underlying Catalyst Composites

An underlying catalyst composite may be readily prepared by processes well known in the prior art. A representative process is set forth below. As desired, the underlying catalyst composite may be prepared in layers on the carrier. For any layer formed by a washcoat, finely divided particles of a high surface area refractory metal oxide such as gamma alumina are slurried in an appropriate vehicle, e.g., water. In one or more embodiments, the slurry is acidic, having a pH of about 2 to less than about 7. The pH of the slurry may be lowered by the addition of an adequate amount of an inorganic or an organic acid to the slurry. Combinations of both can be used when compatibility of acid and raw materials is considered. Inorganic acids include, but are not limited to, nitric acid. Organic acids include, but are not limited to, acetic, propionic, oxalic, malonic, succinic, glutamic, adipic, maleic, fumaric, phthalic, tartaric, citric acid and the like. Thereafter, if desired, water-soluble or water-dispersible compounds of oxygen storage components, e.g., cerium-zirconium composite, a stabilizer, e.g., barium acetate, and a promoter, e.g., lanthanum nitrate, may be added to the slurry. The slurry may thereafter comminuted to result in substantially all of the solids having particle sizes of less than about 20 microns, i.e., between about 0.1-15 microns, in an average diameter. The comminution may be accomplished in a ball mill or other similar equipment, and the solids content of the slurry may be, e.g., about 10-50 wt. %, more particularly about 10-40 wt. %. The carrier may then be dipped one or more times in such slurry or the slurry may be coated on the carrier such that there will be deposited on the carrier the desired loading of the washcoat/metal oxide composite, e.g., about 0.5 to about 3.0 g/in$^3$.

Thereafter the coated carrier is calcined by heating, e.g., at 500-600° C. for about 1 to about 3 hours. Typically, when palladium is desired, the palladium component is utilized in the form of a compound or complex to achieve dispersion of the component on the refractory metal oxide support, e.g., activated alumina. For the purposes of the present invention, the term "palladium component" means any compound, complex, or the like which, upon calcination or use thereof, decomposes or otherwise converts to a catalytically active form, usually the metal or the metal oxide. Water-soluble compounds or water-dispersible compounds or complexes of the metal component may be used as long as the liquid medium used to impregnate or deposit the metal component onto the refractory metal oxide support particles does not adversely react with the metal or its compound or its complex or other components which may be present in the catalyst composition and is capable of being removed from the metal component by volatilization or decomposition upon heating and/or application of a vacuum. In some cases, the completion of removal of the liquid may not take place until the catalyst is placed into use and subjected to the high temperatures encountered during operation. Generally, both from the point of view of economics and environmental aspects, aqueous solutions of soluble compounds or complexes of the precious metals are utilized. For example, suitable compounds are palladium nitrate or rhodium nitrate. During the calcination step, or at least during the initial phase of use of the composite, such compounds are converted into a catalytically active form of the metal or a compound thereof.

Additional layers may be prepared and deposited upon the first layer in the same manner as described above for deposition any layer upon the carrier.

The catalytic layer may also contain stabilizers and promoters, as desired. Suitable stabilizers include one or more non-reducible metal oxides wherein the metal is selected from the group consisting of barium, calcium, magnesium, strontium and mixtures thereof. Preferably, the stabilizer comprises one or more oxides of barium and/or strontium. Suitable promoters include one or more non-reducible oxides of one or more rare earth metals selected from the group consisting of lanthanum, praseodymium, yttrium, zirconium and mixtures thereof.

A catalytic layer may also contain an oxygen storage component. Typically, the oxygen storage component will comprise one or more reducible oxides of one or more rare earth metals. Examples of suitable oxygen storage components include ceria, praseodymia, or combinations thereof. Delivery of ceria into the layer can be achieved by the use of, for example, ceria, a mixed oxide of cerium and zirconium, and/or a mixed oxide of cerium, zirconium, and neodymium.

Carrier

In one or more embodiments, a catalytic material is disposed on a carrier. The carrier may be any of those materials typically used for preparing catalyst composites, and will preferably comprise a ceramic or metal honeycomb structure. Any suitable carrier may be employed, such as a monolithic substrate of the type having fine, parallel gas flow passages extending therethrough from an inlet or an outlet face of the substrate, such that passages are open to fluid flow therethrough (referred to as honeycomb flow through substrates). The passages, which are essentially straight paths from their fluid inlet to their fluid outlet, are defined by walls on which the catalytic material is coated as a washcoat so that the gases flowing through the passages contact the catalytic material. The flow passages of the monolithic substrate are thin-walled channels, which can be of any suitable cross-sectional shape and size such as trapezoidal, rectangular, square, sinusoidal, hexagonal, oval, circular, etc. Such structures may contain from about 60 to about 900 or more gas inlet openings (i.e., cells) per square inch of cross section.

The carrier can also be a wall-flow filter substrate, where the channels are alternately blocked, allowing a gaseous stream entering the channels from one direction (inlet direction), to flow through the channel walls and exit from the channels from the other direction (outlet direction). A dual oxidation catalyst composition can be coated on the wall-flow filter. If such a carrier is utilized, the resulting system will be able to remove particulate matters along with gaseous pollutants. The wall-flow filter carrier can be made from materials commonly known in the art, such as cordierite or silicon carbide.

The carrier may be made of any suitable refractory material, e.g., cordierite, cordierite-alumina, silicon nitride, zircon mullite, spodumene, alumina-silica magnesia, zircon silicate, sillimanite, a magnesium silicate, zircon, petalite, alumina, an aluminosilicate and the like.

The carriers useful for the catalysts of the present invention may also be metallic in nature and be composed of one or more metals or metal alloys. The metallic carriers may be employed in various shapes such as corrugated sheet or monolithic form. Preferred metallic supports include the heat resistant metals and metal alloys such as titanium and stainless steel as well as other alloys in which iron is a substantial or major component. Such alloys may contain one or more of nickel, chromium and/or aluminum, and the total amount of these metals may advantageously comprise at least 15 wt % of the alloy, e.g., 10-25 wt % of chromium, 3-8 wt % of aluminum and up to 20 wt % of nickel. The alloys may also contain small or trace amounts of one or more other metals such as manganese, copper, vanadium, titanium and the like. The surface of the metal carriers may be oxidized at high temperatures, e.g., 1000° C. and higher, to improve the resistance to corrosion of the alloys by forming an oxide layer on the surfaces of the carriers. Such high temperature-induced oxidation may enhance the adherence of the refractory metal oxide support and catalytically promoting metal components to the carrier.

In alternative embodiments, one or more catalyst compositions may be deposited on an open cell foam substrate. Such substrates are well known in the art, and are typically formed of refractory ceramic or metallic materials.

Before describing several exemplary embodiments of the invention, it is to be understood that the invention is not limited to the details of construction or process steps set forth in the following description. The invention is capable of other embodiments and of being practiced in various ways. In the following, preferred designs for the mixed metal oxide composites are provided, including such combinations as recited used alone or in unlimited combinations, the uses for which include catalysts, systems, and methods of other aspects of the present invention.

In embodiment 1, a zoned catalyst composite for an exhaust stream of an internal combustion engine comprising: a monolithic carrier comprising a plurality of longitudinal passages; a zone that begins from one end of the carrier and extends axially along the longitudinal passages such that the zone has a flat profile, the zone comprising a catalytic material that is effective to convert and/or trap one or more components in the exhaust stream.

In embodiment 2, there is a system for treatment of an internal combustion engine exhaust stream including hydrocarbons, carbon monoxide, and other exhaust gas components, the emission treatment system comprising: an exhaust conduit in fluid communication with the internal combustion engine via an exhaust manifold; and any of the zoned catalyst composites provided herein.

Embodiment 3 is a method for treating exhaust gases comprising contacting a gaseous stream comprising hydrocarbons, carbon monoxide, and nitrogen oxides with any of the zoned catalyst composites provided herein.

Embodiment 4 is a method of making a zoned catalyst composite, the method comprising: forming a shear thinning washcoat; and dipping an inlet end of a monolithic carrier comprising a plurality of longitudinal passages into the washcoat to a depth to form an inlet zone that has a flat profile.

Any of embodiments 1-4 can have one or more of the following optional design features:

the component is carbon monoxide (CO), hydrocarbons (HC), nitrogen oxides (NOx), soot, ammonia ($NH_3$), $SO_x$ ($SO_2$, $SO_3$) and/or hydrogen disulfide ($H_2S$);

the zone comprises up to one inch (2.54 cm) of the carrier's length;

the zone comprises in the range of 2 mm to 0.5 inches (1.27 cm) carrier's length;

the zone has an average thickness in the range of 10-60 μm;

the zone is formed from a washcoat that is shear thinning having a pseudoplastic index in the range of 5-7;

the zone is formed from a washcoat that has a viscosity in the range of 100-750 centipoise (cp);

the zone is formed from a washcoat that has a yield point in the range of 1.5-10.0;

the zone is formed from a washcoat loading in the range of 0.10 to 1.0 $g/in^3$;

the catalytic material comprises a platinum group metal (PGM), a base metal (BM), an oxygen storage component (OSC), and/or a molecular sieve.

the zone comprises a mean particle size in the range of 5 to 20 μm.

the zone is formed from a washcoat that comprises the catalytic material in combination with a rheology system having one or more organic compounds comprising a polymeric thickener, a surfactant, and/or a dispersant;

the rheology system comprises a polymeric thickener, a surfactant, and a dispersant.

the distance of the zone from the one end of the carrier varies in the range of 0 to 15% from passage-to-passage;

the concentration of active components in the catalytic material of the zone at the one end of the carrier as compared the concentration at the end of the zone varies in an amount of not more than 10%.

the thickness of the zone for each passage at the one end of the carrier as compared the thickness at the end of the zone varies in an amount of not more than 15%;

after dipping, providing a gaseous pulse through the longitudinal passages to remove excess washcoat; and applying a vacuum pressure to the passages during the dipping step.

EXAMPLES

The following examples illustrate the preparation and characterization of representative embodiments related to the present invention. However, the present invention is not limited to these examples.

Example 1

This example describes the preparation of a zoned catalyst composite having a one inch light-off zone. A slurry was prepared by mixing alumina, zirconium acetate, and a platinum salt and by adjusting the pH to about 5. The slurry had a solid content of approximately 43%. The slurry was milled to a final particle size in the range of 9-11 microns. To form a washcoat, a rheology system that comprised, by weight of the slurry, 0.5% dispersant, 1% surfactant, and 5% polymeric thickener was added to the slurry. One end of a flow through carrier 3.66" 3.0"400/4 (400 cells per square inch with a 4 mil wall) was dipped into the washcoat and a vacuum was applied to coat the passages of the carrier. The coated carrier was calcined at 450° C. peak temperature in a continuous belt calciner, 20 minutes at peak temperature to form a short 1 inch zoned catalyst composite with a flat profile and a catalytic material content dry gain of 0.55 $g/in^3$ and contents by weight of 91.2% alumina, 4.6% zirconium, and 4.2% platinum.

Example 2

This example describes the preparation of a zoned catalyst composite having a one-half inch Pt—Pd light-off zone on an underlying Diesel Oxidation Catalyst (DOC). A three inch substrate having a unit volume of 75.44 $in^3$ was used.

The components in the underlying DOC were a high surface area silica-doped gamma alumina, a sulfuric acid-leached ("SAL") beta zeolite, a 6% Pd-doped gamma alumina, zirconium oxide, and platinum, at concentrations of approximately 78.1%, 12.2%, 7.6%, 0.83%, and 1.22%, respectively, based on the calcined weight of the catalyst. During preparation of the DOC washcoat, the components were mixed with a polymeric thickener and a surfactant. There was not a calcination step after the substrate was coated. The total loading of the underlying catalyst layer was 3.0 $g/in^3$. The DOC contained 80 $g/ft^3$ Pt and 40 $g/ft^3$ Pd.

For an inlet zone, a slurry was prepared by supporting platinum on a 6% Pd-doped gamma alumina. The slurry had a solids content of approximately 43%. The slurry was milled to a final particle size in the range of 8-10 microns. To form a washcoat, a rheology system that comprised, by weight of the slurry, 0.25% dispersant, 1% surfactant, and 15% polymeric thickener was added to the slurry. One end of the substrate was dipped into the washcoat and a vacuum was applied to coat the passages of the substrate, which was then calcined at 450° C. peak temperature in a continuous belt calciner, 20 minutes at peak temperature to form a short zoned catalyst composite with a flat profile overlying a DOC catalyst. The zone had a dry gain of 1.0 $g/in^3$ and contents by weight of 80.6% alumina, 9.7% palladium, and 9.7% platinum.

Example 3

Comparative

This example describes the preparation of comparative example providing only the underlying Diesel Oxidation Catalyst (DOC) as described in Example 2. A three inch substrate having a unit volume of 75.44 in$^3$ was used.

Example 4

Testing

FIG. 1 shows a photograph of Example 2 and Comparative Example 3, where the flat zone 20 of Example 3 is shown. Example 2 and Comparative Example 3 were tested for pressure drop under both 2 inches and 3 inches of air flow. As shown in Table 1, the presence of a 0.5 inch zone having a dry gain of 1 g/in$^3$ did not significantly impact pressure drop.

TABLE 1

|  | Pressure drop 2" air flow | Pressure drop 3" air flow |
|---|---|---|
| Example 2 | 186 | 256 |
| Comparative Example 3 | 187 | 258 |

Figure 4:
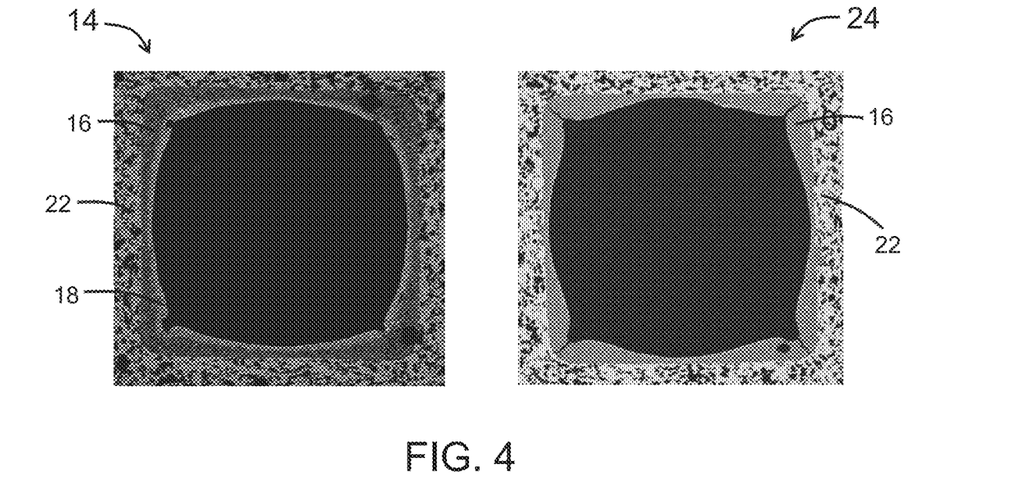
FIG. 4 provides photomicrographs of an exemplary zoned catalyst composite.
Figure 5:
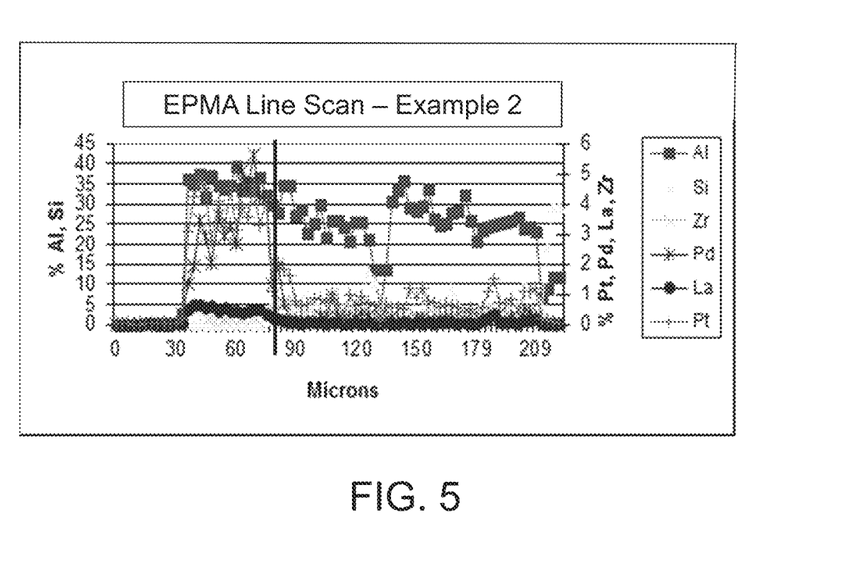
FIGS. 5-6 provide graphs of component content based on a line scan of the exemplary zoned catalyst composite.
Figure 6:
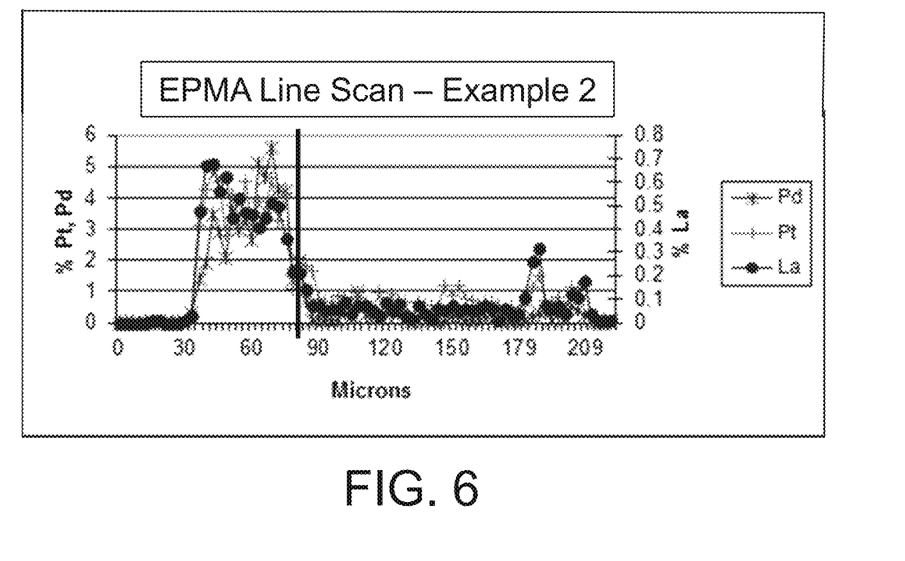

FIG. 4 provides end-on scanning electron microscopy (SEM) microphotographs of the zoned catalyst composite of Example 2 showing the inlet end 14 where the underlying DOC catalyst 16 is located on the carrier 22 and the zone 18 is located on the underlying DOC catalyst 16. The outlet end 24 does not have a zone, the underlying DOC catalyst 16 is located on the carrier 22. Line scans of the zoned catalyst composite of Example 2 are provided in FIGS. 5-6. Table 1 demonstrates that the inclusion of a highly concentrated PGM "AdZone" has essentially no negative impact on the flow properties, for example pressure drop (ΔP), of the final catalyst when compared to a non-zoned version. SEM photomicrographs demonstrate a thin but uniform over coating and electron probe microanalysis (EPMA) line scans indicate PGM (both Pd and Pt) concentration increase by factor of 5 as compared to the non-zoned area.

Example 5

This example describes the preparation of a zoned catalyst composite having a one-half inch Pd light-off zone or "AdZone" on an underlying zoned Three-Way Conversion (TWC) catalyst. A 600/4.3 flow through substrate (600 cells per square inch with a 4.3 mil wall) was used.

The underlying zoned TWC catalyst had a front underlying catalytic zone utilizing 67.5 g/ft$^3$ Pd over a nominal distance of 1.25 inches and a dry gain of 0.5 g/in$^3$ and a back underlying catalytic zone utilizing 12.5 g/ft$^3$ Pd over a nominal distance of 1.25 inches and a dry gain of 1.8 g/in$^3$.

An 300 g/ft$^3$ Pd inlet zone was formed on the underlying zoned DOC at a dry gain of 0.44 g/in$^3$. The slurry had a solids content of approximately 11%. The rheology system added to the slurry to form the washcoat comprised, by weight of the slurry, 0.25% dispersant, 1.0% % surfactant, and 15% % polymeric thickener. One end of the substrate was dipped into the washcoat and a vacuum was applied to coat the passages of the substrate, which was then calcined at 450° C. peak temperature in a continuous belt calciner, 20 minutes at peak temperature to form a short zoned catalyst composite with a flat profile overlying a zoned DOC catalyst. FIG. 2. demonstrates the resulting short zone with a flat profile, and nominal length of 0.5" (12.7 mm), where variation among the longitudinal passages was no more than 12.5%.

A top coat comprising of 2.5 g/ft$^3$ Rh and a dry gain of 0.5 g/in$^3$ was applied to the entire front zone with a back zone of 2.0 g/in$^3$. This was carried out to enhance fast light-off characteristics of the short light-off Pd zone by limiting the thermal mass.

Example 6

This example describes the preparation of zoned catalyst composites having a one-half inch Pt—Pd light-off zone on an underlying two-coat Diesel Oxidation Catalyst (DOC). Two different carriers were used: Big Bore—11.8"×4.0" Emitec 300/600 LS with a mantel overhang and V8—7.5"× 4.0" Emitec 300/600 LS with a mantel overhang.

The components in the bottom coat of the underlying DOC were a high surface area gamma alumina, zirconium oxide, and a binder at concentrations of approximately 96.9%, 1.2%, and 1.9%, respectively, based on the calcined weight of the catalyst. The substrate was coated with the bottom coat washcoat and calcined. The dry loading of the bottom coat was 0.8 g/in$^3$. The components in the top coat of the underlying DOC were a high surface area gamma alumina, a lanthana-promoted high surface area gamma alumina, zirconium oxide, a binder, platinum, and palladium at concentrations of approximately 46.95%, 46.95%, 2.9%, 1.9%, 1.1%, and 0.2% respectively, based on the calcined weight of the catalyst. The substrate was coated with the top coat washcoat and calcined. The dry loading of the top coat was 2.1 g/in$^3$. The DOC contained 39.2 g/ft$^3$ Pt and 9.8 g/ft$^3$ Pd.

For an inlet zone, a slurry was prepared in accordance with Example 2 by supporting platinum on a 6% Pd-doped gamma alumina. The slurry had a solids content of approximately 43%. The slurry was milled to a final particle size in the range of 8-10 microns. To form a washcoat, a rheology system that comprised, by weight of the slurry, 0.25% dispersant, 1% surfactant, and 15% polymeric thickener was added to the slurry. One end of the substrate was dipped into the washcoat and a vacuum was applied to coat the passages of the substrate, which was then calcined at 450° C. peak temperature in a continuous belt calciner, 20 minutes at peak temperature to form a short zoned catalyst composite with a flat profile overlying a DOC catalyst. The zone had a dry gain of 1.0 g/in$^3$ and contents by weight of 80.6% alumina, 9.7% palladium, and 9.7% platinum.

Example 7

Comparative

This example describes the preparation of comparative example providing only the underlying two-coat Diesel Oxidation Catalyst (DOC) as described in Example 6. Two different carriers were used: Big Bore—11.8"×4.0" Emitec 300/600 LS with a mantel overhang and V8—7.5"×4.0" Emitec 300/600 LS with a mantel overhang.

Example 8

Testing

Figure 7:
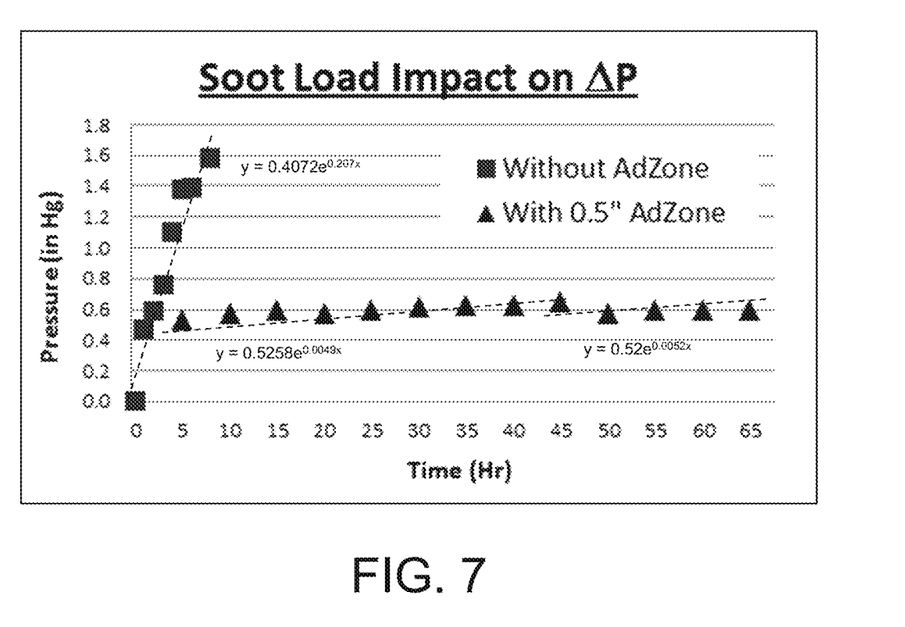
FIG. 7 provides a graph of pressure drop between zoned catalysts composites and non-zoned catalyst composites.

FIG. 7 shows a graph of pressure drop over time of the inventive zone composites of Example 6 ("with 0.5" AdZone") and those of Comparative Example 7 ("without AdZone"). As shown in FIG. 7, the presence of a 0.5 inch zone having a dry gain of 1 g/in$^3$ maintained a pressure drop of no more than 0.7 in Hg over 65 hours. In contrast, the comparative examples show a spike of pressure of about 1.7 in Hg in less than 10 hours.

Use of a 0.5 inch AdZone is effective at maintaining reduced soot load and low pressure drop (ΔP).

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments.

While this invention has been described with an emphasis upon preferred embodiments, it will be obvious to those of ordinary skill in the art that variations in the preferred devices and methods may be used and that it is intended that the invention may be practiced otherwise than as specifically described herein. Accordingly, this invention includes all modifications encompassed within the spirit and scope of the invention as defined by the claims that follow.

What is claimed:

1. A zoned catalyst composite for an exhaust stream of an internal combustion engine comprising:
   a monolithic carrier comprising a plurality of longitudinal passages;
   a zone that begins from one end of the carrier and extends axially along the longitudinal passages such that the zone has a flat profile, the zone comprising a catalytic material that is effective to convert and/or trap one or more components in the exhaust stream;
   wherein at least one of the following conditions is met: (i) the distance of the zone from the one end of the carrier varies in the range of 0 to 15% from passage-to-passage; and (ii) for each passage, the thickness of the zone at the one end of the carrier as compared to the thickness at the end of the zone varies in an amount of not more than 15%.

2. The zoned catalyst composite of claim 1, wherein the component is carbon monoxide (CO), hydrocarbons (HC), nitrogen oxides (NOx), soot, ammonia ($NH_3$), $SO_x$ ($SO_2$, $SO_3$) and/or hydrogen disulfide ($H_2S$).

3. The zoned catalyst composite of claim 1, wherein the zone comprises up to one inch (2.54 cm) of the carrier's length.

4. The zoned catalyst composite of claim 1, wherein the zone comprises in the range of 2 mm to 0.5 inches (1.27 cm) carrier's length.

5. The zoned catalyst composite of claim 1, wherein the catalytic material comprises a platinum group metal (PGM), a base metal (BM), an oxygen storage component (OSC), and/or a molecular sieve.

6. The zoned catalyst composite of claim 1, wherein the zone has an average thickness in the range of 10-60 μm.

7. The zoned catalyst composite of claim 1, wherein the zone is formed from a washcoat that is shear thinning having a pseudoplastic index in the range of 5-7.

8. The zoned catalyst composite of claim 1, wherein the zone is formed from a washcoat that has a viscosity in the range of 100-750 centipoise (cp).

9. The zoned catalyst composite of claim 1, wherein the zone is formed from a washcoat that has a yield point in the range of 1.5-10.0.

10. The zoned catalyst composite of claim 1, wherein the zone is formed from a washcoat that comprises the catalytic material in combination with a rheology system having one or more organic compounds comprising a polymeric thickener, a surfactant, and/or a dispersant.

11. The zoned catalyst composite of claim 10, wherein the rheology system comprises a polymeric thickener, a surfactant, and a dispersant.

12. The zoned catalyst composite of claim 1, wherein the zone is formed from a washcoat loading in the range of 0.10 to 1.0 $g/in^3$.

13. The zoned catalyst composite of claim 1, wherein the zone comprises a mean particle size in the range of 5 to 20 μm.

14. The zoned catalyst composite of claim 1, wherein the distance of the zone from the one end of the carrier varies in the range of 0 to 15% from passage-to-passage.

15. The zoned catalyst composite of claim 1, wherein for each passage, the concentration of active components in the catalytic material of the zone at the one end of the carrier as compared the concentration at the end of the zone varies in an amount of not more than 10%.

16. The zoned catalyst composite of claim 1, wherein for each passage, the thickness of the zone at the one end of the carrier as compared to the thickness at the end of the zone varies in an amount of not more than 15%.

17. A system for treatment of an internal combustion engine exhaust stream including hydrocarbons, carbon monoxide, and other exhaust gas components, the emission treatment system comprising:
   an exhaust conduit in fluid communication with the internal combustion engine via an exhaust manifold; and
   the zoned catalyst composite according to claim 1.

18. A method for treating exhaust gases comprising contacting a gaseous stream comprising hydrocarbons, carbon monoxide, and nitrogen oxides with the zoned catalyst composite according to claim 1.

19. A method of making a zoned catalyst composite, the method comprising:
   forming a shear thinning washcoat; and
   dipping an inlet end of a monolithic carrier comprising a plurality of longitudinal passages into the washcoat to a depth to form an inlet zone that has a flat profile;
   wherein at least one of the following conditions is met: (i) the distance of the zone from the inlet end of the carrier varies in the range of 0 to 15% from passage-to-passage; and (ii) for each passage, the thickness of the zone at the inlet end of the carrier as compared to the thickness at the end of the zone varies in an amount of not more than 15%.

20. The method of claim 19 further comprising after dipping, providing a gaseous pulse through the longitudinal passages to remove excess washcoat.

21. The method of claim 19 further comprising applying a vacuum pressure to the passages during the dipping step.

* * * * *